United States Patent Office 3,458,527
Patented July 29, 1969

3,458,527
CERTAIN EPOXY-CONTAINING 2-OXAZOLIDINONES
Charles H. Schramm, Easton, Pa., and Claude J. Schmidle, Hudson, Ohio, assignors to J. T. Baker Chemical Company, Phillipsburg, N.J., a corporation of New Jersey
No Drawing. Continuation-in-part of application Ser. No. 274,923, Apr. 23, 1963. This application Dec. 20, 1965, Ser. No. 515,149
Int. Cl. C07d *85/28;* C08g *33/02, 23/00*
U.S. Cl. 260—307                                    5 Claims This application is a continuation-in-part of our copending application Ser. No. 274,923, filed on Apr. 23, 1963, now abandoned.

This invention relates to a novel class of epoxy-oxazolidinone derivatives and to a method for their preparation. In a particular aspect this invention relates to polymerizable and polymerized 2-oxazolidinone compounds having at least one epoxy-containing substituent and to intermediates for their preparation. The polymers of the present invention range from elastic and fiber-forming thermoplastic resins to hard, tough thermoset resins.

It is an object of the present invention to provide a method for producing epoxyoxazolidinone derivatives.

It is another object of this invention to provide polymerizable, polymerized, and copolymerized epoxyoxazolidinone compositions.

It is another object of this invention to provide resins uniquely adapted for many of the same applications as polyurethane resins.

It is a further object of the present invention to provide novel epoxy resins having improved properties as compared to conventional epoxy resins.

Other objects and advantages of the present invention will become apparent to one skilled in the art from the accompanying description and disclosure.

Accordingly, one or more of the objects of the present invention can be accomplished by a process which comprises subjecting a poly(beta-haloalkylurethano) halohydrin to dehydrohalogenation conditions to produce a poly-(epoxyalkyl-2-oxazolidinone) compound containing at least one 2-oxazolidinone group and at least two epoxy groups.

Poly(beta-haloalkylurethano) halohydrin can be prepared by the reaction of a polyisocyanate with a poly-(halohydrin) in quantities providing between about 1.1 and 4.0 halohydrin groups per isocyanato group.

The term "polyisocyanate" refers to compounds containing two or more isocyanato (—NCO) groups.

The term "poly(halohydrin)" refers to compounds containing two or more halohydrin

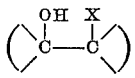

groups, wherein X is halogen.
The term "beta-haloalkylurethano" refers to the

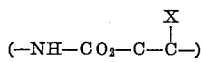

radical.
The term "epoxide" or "epoxy" refers to the oxirane group

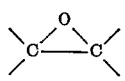

The term "2-oxazolidinone" refers to the structure:

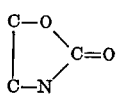

The term "epoxyoxazolidinone" or "epoxy-substituted 2-oxazolidinone" refers to organic compounds containing one or more 2-oxazolidinone groups and one or more epoxy groups and which are generally characterized by an average molecular weight up to about 5,000 and higher.

The term "poly(epoxyalkyl-2-oxazolidinone)" refers to organic compounds containing one or more 2-oxazolidinone groups and two or more epoxy groups.

The preparation of (beta-haloalkylurethano) halohydrin compounds and poly(beta-haloalkylurethano) halohydrin compounds is more fully described in our copending patent application Ser. No. 515,150, filed on Dec. 20, 1965. A preferred class of poly(beta-haloalkylurethano) halohydrin compounds can be represented by the formula:

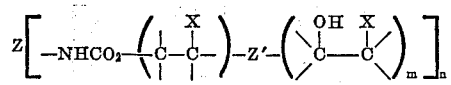

wherein Z is a polyvalent organic radical selected from aliphatic and aromatic structures such as alkylene, substituted alkylene, alkyleneoxy, alkenylene, substituted alkenylene, arylene, substituted arylene, and the like; Z' is a polyvalent organic radical selected from aliphatic and aromatic structures such as alkylene, substituted alkylene, alkyleneoxy, cycloalkylene, substituted cycloalkylene, arylene, substituted arylene, aryleneoxy, aralkylene, substituted aralkylene, and the like; and Z' can also be zero, i.e., Z' can be a covalent bond directly connecting two halohydrin moieties; X is halogen, preferably chlorine or bromine; m is an integer between 1 and 5, and n is an integer between 2 and 10. Particularly preferred compounds corresponding to the above general formula for the poly(beta-haloalkylurethano) halohydrin compounds are those having a molecular weight up to about 5,000 and higher.

Within the above illustrated class of poly(beta-haloalkylurethano) halohydrin compounds, those represented by the following formula are particularly preferred:

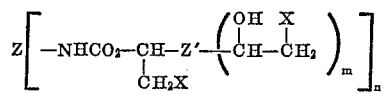

wherein Z, X, Z', m and n have the same meaning given in the above illustrated formula for the poly(beta-haloalkylurethano) halohydrin compounds. Preferably Z is tolylene; X is chlorine or bromine and particularly chlorine; m is 1; n is 2; and Z' is selected from the group consisting of alkylene, e.g., methylene, ethylene, propylene, etc.; chlorine substituted alkylene, e.g., divalent chloroethylene, and alkyleneoxy, e.g., methyleneoxy, ethyleneoxy, propyleneoxy, and the like. Illustrative of a Z' group is the organic residue of a dihalohydrin prepared by reacting epichlorohydrin with a poly(oxyalkylene) glycol having from 2 to 4 carbon atoms in each alkylene group. The epichlorohydrin reacted with the poly(oxyalkylene) glycol is preferably in a molar ratio of 2 moles of epichlorohydrin per mole of poly(oxyalkylene) glycol. This organic residue can be represented by the formula:

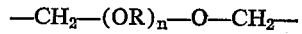

wherein R is alkylene of 2 to 4 carbon atoms and n represents repeating units of the (OR) groups. The molecular weight of the poly(oxyalkylene) glycol reactant for the preparation of the polyhalohydrin can vary over a broad range from about 100 to 4,000 and preferably from about 150 to 1,000. The integer n for the (OR) groups will have the same value as the number of repeating (OR) groups of the poly(oxyalkylene) glycol reactant.

Illustrative of the above described process for the preparation of an epoxyoxazolidinone is the interaction of hexamethylene diisocyanate with 2,3-dichloro-1,4-butanediol followed by dehydrochlorination to produce 1,6-bis(4-epoxy-2-oxazolidinon-3-yl)hexane:

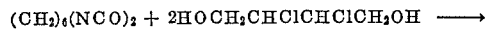

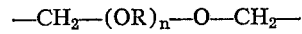

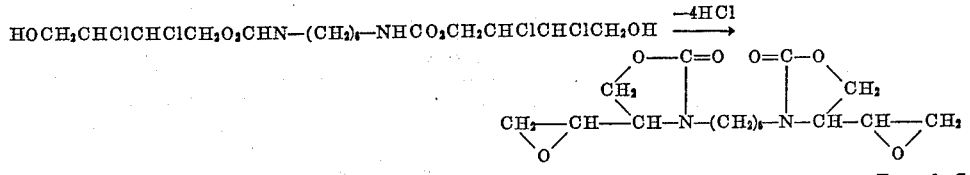

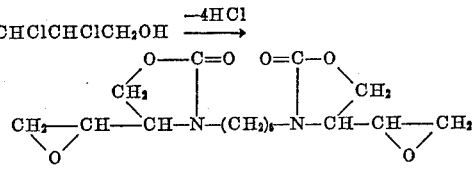

Formula C molar ratio of 2 moles of epichlorohydrin per mole of poly(oxyalkylene) glycol. This organic residue can be represented by the formula:

$$-CH_2-(OR)_n-O-CH_2-$$

wherein R is alkylene of 2 to 4 carbon atoms and $n$ represents repeating units of the (OR) group.

In addition to carbon, hydrogen, oxygen, sulfur, nitrogen and halogen atoms, the compounds and resins of the present invention can contain silicon, titanium, phosphorus, and the like.

Epoxyoxazolidinone derivatives contemplated to be produced by the invention process include those which correspond to the structure:

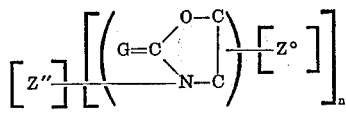

where $Z''$ is a polyvalent organic radical, $Z°$ is a polyvalent organic radical which contains at least one epoxy group, and $n$ is a whole number of from 2 to 10 and higher.

Among the preferred epoxyoxazolidinone derivatives are those which correspond to the structure:

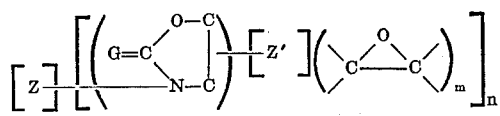

Formula A wherein Z is a polyvalent organic radical selected from aliphatic and aromatic structures such as alkylene, substituted alkylene, alkyleneoxy, alkylene, substituted alkenylene, arylene, substituted arylene, and the like; $Z'$ is a polyvalent organic radical selected from aliphatic and aromatic structures such as alkylene, substituted alkylene, alkyleneoxy, cycloalkylene, substituted cycloalkylene, arylene, substituted arylene, aryleneoxy, aralkylene, substituted aralkylene, and the like, and $Z'$ can also be zero, i.e., $Z'$ can be a covalent bond directly connecting an oxazolidinone group with an epoxy group; G is sulfur or oxygen and preferably oxygen, $m$ is a whole number of from 1 to 5 and higher, and $n$ is a whole number of from 2 to 10 and higher. Preferably, Z is tolylene and $n$ is 2. In another aspect of this invention described more fully hereinafter, the compounds can contain a single epoxy group, i.e., in the above general formula, $m$ and $n$ are each equal to one.

Within the above illustrated class of epoxyoxazolidinone derivatives, those represented by the following formula are particularly preferred:

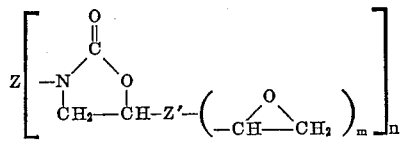

Formula B wherein Z, $Z'$, $m$ and $n$ have the same meaning as in the above illustrated class of epoxyoxazolidinones. Preferably, Z is tolylene or another divalent hydrocarbon group having from about 6 to 12 carbon atoms, e.g., alkylene, alkphenylene, phenylene, etc.; $m$ is 1; $n$ is 2; and $Z'$ is selected from the groups consisting of alkylene, e.g., methylene, ethylene, propylene, etc.; chloro-substituted alkylene, e.g., divalent chloroethylene; and alkyleneoxy, e.g., methyleneoxy, ethyleneoxy, propyleneoxy and the like. Illustrative of a $Z'$ group is the organic residue of a dichlorohydrin prepared by reacting epichlorohydrin with a poly(oxyalkylene) glycol having from 2 to 4 carbon atoms in each alkylene group. Preferably, the epichlorohydrin is reacted with the epoly(oxyalkylene) glycol in a Isothiocyanate reactants are also suitable in place of the isocyanates. Polyisocyanate and polyisothiocyanate reactants suitable for use in the production of the present invention epoxyoxazolidinones (also referred to herein as epoxyoxazolidones) include isocyanato compounds and prepolymers which are being developed for commercially important polyurethane chemistry. Among the preferred polyisocyanates and polyisothiocyanates are those corresponding to the formula $R(NCG)_x$ wherein G is oxygen or sulfur, $x$ is an integer of two or more, and R is an alkylene, substituted alkylene, arylene or substituted arylene radical, a hydrocarbon or substituted hydrocarbon containing one or more aryl —NCG bonds and one or more alkyl —NCG bonds. R can also include radicals such as —RZR— where Z can be a divalent moiety such as —O—, —O—R—O, —CO—, —CO$_2$—, —S—, —S—R—S, —SO$_2$—, and the like. Examples of such compounds include hexamethylene diisocyanate, xylylene diisocyanates, $(OCNCH_2CH_2CH_2OCH_2)_2$, 1-methyl-2,4-diisocyanatocyclohexane, phenylene diisocyanates, tolylene diisocyanates, chlorophenylene, diisocyanates, polyhalophenylene, diisocyanate, diphenylmethane-4,4'-diisocyanate, naphthalene-1,5-diisocyanate, triphenylmethane-4,4',4'' - triisocyanate, xylene-$\alpha,\alpha'$-diisothiocyanate, and isopropylbenzene-$\alpha$,4-diisocyanate.

Further included are dimers and trimers of isocyanates and diisocyanates and polymeric diisocyanates of the general formula $(RNCG)_x$ and $[R(NCG)_x]_y$ in which $x$ and $y$ are two or more, as well as compounds of the general formula $M(NCG)_x$ in which $x$ is two or more and M is a monofunctional or polyfunctional atom or group. Examples of this type include ethylphosphonic diisocyanate, $C_2H_5P(O)(NCO)_2$; phenylphosphonic diisocyanate, $$C_6H_5PO(NCO)_2$$

compounds containing a $\equiv$Si—NCG group, isocyanates derived from sulfonamides, $(R(SO_2NCO)_x$, and the like.

A particularly useful mixture of polyisocyanates are the products obtainable by phosgenation of the reaction products of aniline and formaldehyde as expressed by the following general formula:

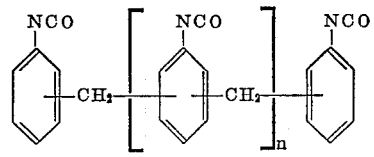

wherein $n=0$ to 10.

Monoisocyanates are employed for the production of the monoepoxide derivatives described more fully hereinafter.

Poly(halohydrin) reactants suitable for use in the invention process are essentially unlimited, and the particular poly(halohydrin) selected will depend on cost, availability, reactivity, the properties of the product sought to be produced, and other practical and theoretical considerations.

The preferred poly(halohydrin) reactants will generally correspond to the structure:

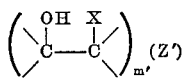

wherein $m'$ is an integer between 2 and 5, and X and Z' are defined hereinabove. X is preferably chlorine or bromine.

Poly(halohydrin) compounds are readily produced by hydrohalogenation of the corresponding polyepoxide compounds. For example, treatment of divinylbenzene dioxide with hydrogen chloride yields the corresponding poly (halohydrin) structure:

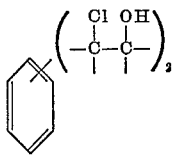

Useful poly(halohydrin) compounds include 1,4-dichlorobutanediol-2,3, 1,4-dibromobutanediol-2,3, 2,3-dichlorobutanediol-1,4, 2,3-dibromobutanediol-1,4, vinylcyclohexene dichlorohydrin, 3,3'-dichloro-2,2'-dihydroxydipropyl ether, epichlorohydrin adducts of polyols and polyhydric phenols including 1,2-ethylenedioxy-bis-(3-chloro-2-propanol), 1,4-butylenedioxy-bis-(3-chloro-2-propanol), and the like, and the corresponding epichlorohydrin adducts of other such polyols such as polyethylene glycol, polypropylene glycol, polybutylene glycol, mixtures of said poly(oxyalkylene) glycols, resorcinol, glycerol, pentaerythritol, sorbitol, poly(vinyl alcohol), and the like.

Other useful poly(halohydrin) compounds are the halohydrin compounds which correspond to polyepoxides (wherein each oxirane group is instead a halohydrin group) such as aliphatic polyol epoxycyclohexanecarboxylates exemplified by compounds which include 3-methyl-1,5-pentanediol bis(3,4-epoxycyclohexanecarboxylate),
1,5-pentanediol bis(3,4-epoxycyclohexanecarboxylate),
2-methoxymethyl-2,4-dimethyl-1,5-pentanediol bis(3,4-epoxycyclohexanecarboxylate,
ethylene glycol bis(3,4-epoxycyclohexanecarboxylate),
2,2-diethyl-1,3-propanediol bis(3,4-epoxycyclohexanecarboxylate),
1,6-hexanediol bis(3,4-epoxycyclohexanecarboxylate),
2-butene-1,4-diol bis(3,4-epoxycyclohexanecarboxylate),
2-butene-1,4-diol bis(3,4-epoxy-6-methylcyclohexanecarboxylate),
1,2,3-propanetriol tris(3,4-epoxycyclohexanecarboxylate);

oxyalkylene glycol epoxycyclohexanecarboxylates exemplified by compounds which include dipropylene glycol bis(2-ethylhexyl 4,5-epoxycyclohexane-1,2-dicarboxylate),
diethylene glycol bis(3,4-epoxy-6-methylcyclohexanecarboxylate),
triethylene glycol bis(3,4-epoxycyclohexanecarboxylate);

epoxycyclohexylalkyl epoxycyclohexanecarboxylates exemplified by compounds which include 3,4-epoxycyclohexylmethyl 3,4-epoxycyclohexanecarboxylate,
3,4-epoxy-1-methylcyclohexylmethyl 3,4-epoxy-1-methylcyclohexanecarboxylate,
3,4-epoxy-2-methylcyclohexylmethyl 3,4-epoxy-2-methylcyclohexanecarboxylate,
(1-chloro-3,4-epoxycyclohexan-1-yl)methyl 1-chloro-3,4-epoxycyclohexanecarboxylate,
(1-bromo-3,4-epoxycyclohexan-1-yl)methyl 1-bromo-3,4-epoxycyclohexanecarboxylate,
(1-chloro-2-methyl-4,5-epoxycyclohexan-1-yl) methyl 1-chloro-2-methyl-4,5-epoxycyclohexanecarboxylate;

epoxycyclohexylalkyl dicarboxylates exemplified by compounds which include bis(3,4-epoxycyclohexylmethyl) pimelate,
bis(3,4-epoxy-6-methylcyclohexylmethyl) maleate,
bis(3,4-epoxy-6-methylcyclohexylmethyl) succinate,
bis(3,4-epoxycyclohexylmethyl) oxalate,
bis(3,4-epoxy-6-methylcyclohexylmethyl) sebacate,
bis(3,4-epoxy-6-methylcyclohexylmethyl) adipate;

epoxycyclohexylalkyl phenylenedicarboxylates exemplified by compounds which include bis(3,4-epoxycyclohexylmethyl) terephthalate,
bis(3,4-epoxy-6-methylcyclohexylmethyl) terephthalate;

epoxycyclohexylalkyl oxyalkylene glycol ethers exemplified by compounds which include bis(3,4-epoxy-6-methylcyclohexylmethyl) diethylene glycol ether;

sulfonyldialkanol bis(epoxycyclohexanecarboxylates) exemplified by compounds which include 2,2'-sulfonyldiethanol bis(3,4-epoxycyclohexanecarboxylate);

epoxycyclohexane-1,2-dicarboximides exemplified by compounds which include

N,N'-ethylene bis(4,5-epoxycyclohexane-1,2-dicarboximide);

epoxycyclohexylalkyl carbamates exemplified by compounds which include di(3,4-epoxycyclohexylmethyl) 1,3-tolylenedicarbamate;

epoxycyclohexylalkyl acetals exemplified by compounds which include bis(3,4-epoxy-6-methylcyclohexylmethyl) 3,4-epoxy-6-methylcyclohexanecarboxaldehyde acetal;

and epoxycyclohexyl-substituted spirobi(metadioxane) derivatives exemplified by compounds which include 3,9-bis(3,4-epoxycyclohexyl)spirobi(metadioxane).

Other poly(halohydrin) compounds can be employed which correspond to polyepoxide derivatives such as 3,4-epoxy-6-methylcyclohexylmethyl 9,10-epoxystearate, 1,2-bis(2,3-epoxy-2-methylpropoxy)ethane, the diglycidyl ether of 2,2-(p-hydroxylphenyl)propane, butadiene dioxide, dicyclopentadiene dioxide, pentaerythritol tetrakis (3,4-epoxycyclohexanecarboxylate), divinylbenzene dioxide, and the like.

A preferred class of poly(halohydrin) reactants are those which can be represented by the formula:

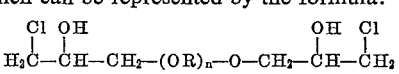

wherein R is straight or branched chain alkylene having from 2 to 4 carbon atoms; e.g., propylene, and $n$ represents repeating units of the (OR) group. Such poly(halohydrins) can be prepared by the reaction of 2 moles of epichlorohydrin with one mole of a poly(oxyalkylene) glycol having from 2 to 4 carbon atoms in each alkylene group in the presence of a catalyst such as boron trifluoride etherate. The molecular weight of the poly(oxyalkylene) glycol can vary over a broad range such as that of from about 100 to 4,000 and preferably from about 150 to 1,000. Another preferred class of poly(halohydrin) reactant is poly(epichlorohydrin).

The useful poly(halohydrin) reactants also include those prepared by halohydrination of polyunsaturated compounds which contain two or more olefinically unsaturated groups reactive to hypohalite addition reactions. The dehydrohalogenation reaction producing epoxyoxazolidinones is readily accomplished by treating poly-(beta-haloalkylurethano) halohydrin with an inorganic or organic acid acceptor such as alkali metal hydroxides and carbonates, ion exchange resins, pyridine, amines, and the like. For example, the dehydrohalogenation can be accomplished by heating the poly(beta-haloalkylurethano)halohydrin with aqueous potassium hydroxide at a temperatue between 5° C. and 150° C. for a period from about five minutes to about four hours or by heating the product mixture with pyridine either in aqueous medium or an organic solvent medium.

The epoxyoxazolidinone compositions of the present invention characteristically range from highly viscous liquids to rubber-like and hard solids. They can be cured with epoxy curing catalysts or reacted with epoxy hardeners, either alone or with other materials, e.g., epoxy monomers and resins, to yield the broad variety of valuable new polymers provided by the present invention. These polymers have many advantageous properties. The particular properties will of course depend on the particular composition since the polymers range from elastic and fiber-forming thermoplastic resins to hard, tough thermoset resins. Illustrative of advantageous properties there can be mentioned: high elongation, good tensile strength, impact resistance, resistance to tearing, resistance to cracking or breaking by changes in temperature (thermal shock), room temperature curing and solvent resistance. Also, the polymeric compositions of this invention can tolerate fairly large quantities, e.g., 50% to 100% of conventional fillers, e.g., silica powder, alumina, aluminum, etc., without deleteriously affecting the properties of the polymers. The polymers have a wide range of applications and uses such as: adhesives, castings, caulking and sealing compounds, coatings, concrete bonding agents, electrical casting, encapsulant and potting compounds, filament winding, industrial flooring, laminates, molding resins, prepregs and tooling compositions.

The polymerizable epoxyazolidinone compositions comprise mixtures of the epoxyoxazolidinone composition described hereinabove and a catalyst quantity of an active polymerization agent. The quantity of catalyst employed can vary in the range between about 0.005 and 15 weight percent based on the total weight of the polymerizable material in a composition, with between about 0.01 and 10 weight percent being the preferred weight range. Suitable polymerization catalysts include acids such as sulfuric acid, alkanesulfonic acids, benzenesulfonic acid, perchloric acid, phosphoric acids, and the like; metal halide Lewis acids and their complexes, such as stannic chloride, stannic bromide, ferric chloride, aluminum chloride, zinc chloride, boron trifluoride, boron trifluoride-ether complexes, boron trifluoride amine complexes, e.g., boron trifluoride-monoethylamine complex, boron trifluoride-piperidine complex, and the like; bases such as sodium hydroxide, alkali metal alcoholates, tertiary amines, e.g., benzyldimethylamine, dimethylaminomethylphenol, triethylenediamine, 2,4,6 - tri(dimethylaminomethyl)phenol, and the like; alkyl titanates such as tetraisopropyl titanate, tetrabutyl titanate, and the like; and other similar catalysts having curing activity. The particularly preferred catalysts from this group include stannic chloride, stannic bromide, boron trifluoride-etherate, boron trifluoride-amine complexes, metal fluoborates, e.g., zinc fluoborate, copper fluoborate, lead fluoborate, and tetraalkyl titanates, e.g., tetraisopropyl titanate, and tetrabutyl titanate.

The polymerizable compositions comprising an epoxyoxazolidinone and a polymerization catalyst can be prepared by the simple expediency of mixing together the composition components at room temperature. The polymerizable compositions can be prepared at the time that they are to be utilized or they can be prepared and stored for future application. The incorporation of the catalyst into the polymerizable compositions can be facilitated if desired, by preparing a catalyst solution with a suitable solvent such as xylene, ethyl acetate, heptane, dioxane, ethyl ether, and the like. Small quantities of water can be used as a solvent with most of the catalysts with the exception of those which decompose in water, e.g., aluminum chloride.

The resinous compositions of this invention are readily obtained from the polymerizable compositions by the application of heat. The curing, i.e., polymerization, occurs readily with or without a solvent at a temperature in the range between about 10° C. and 200° C. The polymerization time can vary over a wide range from several minutes to several days depending on such factors as the nature of the epoxyoxazolidinone, the quantity and reactivity of the catalyst, the absence or presence of a solvent, and the like. It is advantageous to perform the polymerization in a solvent or solvent mixture. Suitable solvents include hydrocarbons such as benzene, xylene, toluene, hexane, heptane, octane, cyclohexane, and various terpenes; oxygenated solvents such as acetone, methylisobutylketone, cyclohexanone, ethyl acetate, butyl acetate, amyl acetate, dioxane, tetrahydrofuran, dibutyl ether, and the like; and other common solvents such as carbon tetrachloride, carbon disulfide, and the like. The progress of the polymerization reaction can be observed by determining the relative viscosity of samples drawn from the reaction mixture. In this manner, it is possible to produce partially polymerized compositions or completely polymerized compositions. The presence of solvent permits the maintenance of adequate stirring, and it provides a medium for applying the final resinous material in coatings and other applications.

In another embodiment of this invention, polymerizable compositions having utility in the fields of coating, laminating, bonding, molding, potting, calendering, and the like, can be prepared from the novel epoxyoxazolidinones by admixing them with various reactive hardening agents. The resinous compositions derived by the polymerization of the admixtures are essentially copolymers of the hardening agent and the epoxyoxazolidinone. The hardening agent, or comonomer, can be any polyfunctional material capable of reaction with epoxide and/or hydroxyl groups to form polymers having the outstanding properties inherent in the resins of this invention. Such polyfunctional materials include polyepoxides, polycarboxylic acids, polycarboxylic acid anhydrides, polycarboxylic acid halides, polyhydric alcohols and phenols, polythiols, polyisocyanates, polyfunctional amines, polyamides, urea-formaldehyde adducts, melamine-formaldehyde adducts, phenol-formaldehyde adducts, and the like. The resinous compositions are prepared from the polymerizable compositions by the application of heat. Illustrative of useful polymerizable compositions and polymerized resinous copolymer compositions are the following:

(1) Polymerizable and polymerized compositions can be prepared from admixtures which comprise (a) epoxyoxazolidinone and (b) a polyfunctional amine, i.e., an amine having at least two active amino hydrogen atoms which can be on the same nitrogen atom or different nitrogen atoms, in an amount sufficient to provide between about 0.2 to 4.0 amino hydrogen atoms per epoxy group of said epoxyoxazolidinone and preferably between about 0.5 and 2.0 amino hydrogen atoms per epoxy group. Suitable polyfunctional amines include monoamines, diamines, triamines, and higher polyamines such as 2-ethylhexylamine, aniline, phenethylamine, cyclohexylamine, 2-aminophenol, 1,3-diamino-2-propanol, ethylenediamine, butylenediamine, xylylenediamine, hexamethylenediamine, dihexylenetriamine, diethylenetriamine, triethylenetetraamine, dipropylenetriamine, m-phenylenediamine, p-phenylenediamine, guanidine, p,p'-diaminodiphenylsulfone, p,p'-methylenedianiline, bisaniline-F, aminoethylpiperazine, diethylene triamine, bis(aminopropyl)-piperazine, and the like. The polyfunctional amines can be pre-reacted with epoxy compounds in greater than equivalent proportions to produce modified hardeners with amine end groups. This method permits the use of low-boiling amines which otherwise might be too volatile. Suitable modifier epoxy compounds include ethylene oxide, proplene oxide, butadiene dioxide, soybean oil epoxide, safflower oil epoxide, glycidyl ethers, and the like. Other suitable modified amine hardeners are prepared by the condensation of a polyfunctional amine with an unsaturated compound, e.g., the condensation of diethylenetriamine with acrylonitrile. Catalysts suitable for polymerizing the admixtures of amines and epoxyoxazolidinones include alcohols, phenols and metal halide Lewis acid-amine complexes such as piperidine-boron trifluoride, and monoethylamine-boron trifluoride. The catalyst concentration can range from about 0.05 to 10 weight percent based on the total weight of polymerizable components in an admixture. The polymerization reaction can be performed with or without a catalyst, as desired.

(2) Polymerizable and polymerized compositions can be prepared from admixtures which comprise (a) an epoxyoxazolidinone, (b) a polycarboxylic acid in an amount having $y$ carboxyl equivalents of acid per epoxy equivalent of said epoxyoxazolidinone, and (c) a polycarboxylic acid anhydride in an amount having $x$ carboxyl equivalents of anhydride per epoxy equivalent of said epoxyoxazolidinone, where $y$ is a number in the range from about 0.3 to 3.0, $x$ is a number in the range from 0.0 to about 1.5, the sum of $y+x$ is not greater than about 3.0, and $x/y$ is less than 1.0.

Illustrative polycarboxylic acids which can be employed include aliphatic aromatic, and cycloaliphatic polycarboxylic acids such as oxalic acid, malonic acid, glutaric acid, maleic acid, suberic acid, citraconic acid, 1,2-cyclohexanedicarboxylic acid, phthalic acid, 1,8-napthalenedicarboxylic acid, 3-carboxycinnamic acid, 1,2,4-butanetricarboxylic acid, 1,2,4-hexanetricarboxylic acid, 1,2,4-benzenetricarboxylic acid, and the like; polycarboxy polyesters, i.e., polyesters containing more than one carboxy group per molecule, such as polycarboxylic acids of the type exemplified above, or the corresponding anhydrides, esterified with polyhydric alcohols which include ethylene glycol, diethylene glycol, triethylene glycol, tetraethylene glycol, propylene glycol, 1,6-hexanediol, trimethylolpropane, pentaerythritol, dimethylolphenol, inositol, poly(vinyl alcohols), and the like.

Polycarboxylic acid anhydrides which can be employed as modifiers include the anhydrides of maleic acid, chloromaleic acid, dichloromaleic acid, succinic acid, citraconic acid, itaconic acid, alkyl succinic acids, alkenyl succinic acids, phthalic acid, tetrahydrophthalic acid, methyltetrahydrophthalic acid, hexahydrophthalic acid, chlorendic acid, glutaric acid, adipic acid, sebacic acid, and the like. It will be noted that the polycarboxylic acid is a major component of the admixture.

Catalysts which are effective in accelerating the curing of the admixtures include acids such as sulfuric, perchloric, polyphosphoric, benzenesulfonic acid, toluenesulfonic acid, and the like. Also included are the metal halide Lewis acids, e.g., boron trifluoride, stannic chloride, zinc chloride, ferric chloride, aluminum chloride and the complexes of these acids, such as boron trifluoride-ether complex, boron trifluoride-piperidine complex, boron trifluoride-monoethylamine complex, boron trifluoride-1,6-hexanediamine complex and the like. Catalyst concentrations can vary over the range from 0.001 to 5.0 weight percent based on the weight of polymerizable material.

(3) Polymerizable and polymerized compositions can be prepared from admixtures which comprise (a) an epoxyoxazolidinone, (b) a polycarboxylic acid anhydride in an amount having $x$ carboxyl equivalents of anhydride per epoxy equivalent of said epoxyoxazolidinone, and (c) a modifier compound in an amount having $m$ active hydrogen equivalents of modifier compound per epoxy equivalent of said epoxyoxazolidinone, wherein $x$ is a number in the range from about 0.2 to 4.0, preferably from about 0.5 to 2.0, $m$ is a number in the range from about 0.0 to 1.0, the sum of $x+m$ is not greater than 4.0 and $x/m$ is at least 1.0. Suitable polycarboxylic acid anhydrides are exemplified by those listed in section (2) above. The preferred hydrogen modifier compounds are polycarboxylic acids and polyhydric alcohols and phenols. Illustrative of the preferred active hydrogen modifier compounds are ethylene glycol, glycerol, pentaerythritol, inositol, poly(vinyl alcohol), trimethylolphenol, resorcinol, hydroquinone, polyhydric phenolformaldehyde condensation products, oxalic acid, maleic acid, itaconic acid, phthalic acid, 1,1,5-pentanetricarboxylic acid, azelaic acid, malic acid, and the like. Other active hydrogen compounds useful as modifiers can be prepared by the condensation of polyols with dicarboxylic acid anhydrides in such proportions required to give polyesters with carboxyl and hydroxyl end groups. These esters can be prepared from the above-listed anhydrides or acids and polyols such as ethylene glycol, diethylene glycol, triethylene glycol, tetraethylene glycol, propylene glycol, 1,6-hexanediol, glycerol, 1,2,6-hexanetriol, trimethylolpropane, pentaerythritol, trimethylolphenol, inositol, poly(vinyl alcohol), and the like. Any one or combination of the three types of modifiers can be employed. It will be noted that the polycarboxylic acid anhydride is a major component of the admixtures. Catalysts which are effective in accelerating the anhydride-epoxide reactions of this invention include acids, such as sulfuric acid, perchloric acid, phosphoric acid, polyphosphoric acid, benzenesulfonic acid, toluenesulfonic acids, and the like; metal halide Lewis acids, such as boron trifluoride, stannic chloride, zinc chloride, ferric chloride, aluminum chloride and the complexes of such acids, e.g., boron trifluoride-ether complex, boron trifluoride-piperidine complex, boron trifluoride-monoethylamine complex, boron trifluoride-1,6-hexanediamine complex, and the like; basic catalysts such as the alkali metal hydroxides, e.g., sodium and potassium hydroxides, and amines, e.g., pyridine, alpha-methylbenzyldimethylamine, dimethylaminoethylphenol, 2,4,6-tris(dimethylaminomethyl)phenol, triethylamine, trimethylammonium hydroxide, and the like. Catalyst concentrations can vary over the range from 0.001 to 5.0 weight percent based on the total weight of polymerizable material.

(4) Polymerizable and polymerized compositions can be prepared from admixtures comprising (a) an epoxyoxazolidinone and (b) a polyol, i.e., an organic compound having at least two hydroxyl groups which are alcoholic hydroxyl groups, phenolic hydroxyl groups, or both alcoholic and phenolic hydroxyl groups, e.g., aliphatic and cycloaliphatic polyalcohols and polyhydric phenols. The polyol is employed in an amount which provides between about 0.2 and 4.0 hydroxyl equivalents per epoxy equivalent of said epoxyoxazolidinone. These compositions can be further modified by incorporating therein a polycarboxylic acid compound or polycarboxylic acid anhydride such as those illustrated in section (2) above. It is pointed out that the polyol is a major component as compared with the modifier. Typical polyols which can be employed include ethylene glycol, diethylene glycol, glycerol, polypropylene glycols, butanediol, triethanolamine, pentaerythritol, trimethylolethane bis(4-hydroxyphenyl)methane, inositol, sorbitol, trimethylolphenol, resorcinol, pyrogallol, hydroquinone, 1,8-naphthalenediol, 2,4,6-trimethylolphenol allyl ether, cyclohexanediol, and the like.

(5) Polymerizable and polymerized compositions can be prepared from admixtures which comprise (a) an epoxyoxazolidinone and (b) a compound containing two or more epoxide groups in an amount sufficient to provide between 0.2 and 4.0 epoxy equivalents per hydroxyl equivalent of said epoxyoxazolidinone. Suitable epoxides include the diglycidyl ether of bisphenol A, diglycidyl ether polychlorohydrin and epichlorohydrin adducts of diols and polyols, diglycidyl ether, butadiene dioxide, vinylcyclohexene dioxide, soybean oil epoxide, divinylbenzene dioxide bis(2,3-epoxycyclopentyl)ether, dicyclopentadiene dioxide, the polyepoxides mentioned above from which the poly(halohydrin) reactants of this invention can be prepared, and the like.

(6) Polymerizable and polymerized compositions can be prepared from admixtures which comprise (a) an epoxyoxazolidinone and (b) a polycarboxylic acid such as those illustrated in section (2) above in an amount sufficient to provide between 0.3 and 3.0 carboxyl equivalents per epoxy equivalent of said epoxyoxazolidinone. A polyol of the type exemplified in section (4) above can be employed to further modify the compositions. In these admixtures the polycarboxylic acid is a major component as compared with the polyol modifier.

(7) Polymerizable and polymerized compositions can be prepared from admixtures comprising (a) an epoxyoxazolidinone and (b) any one of the following classes of compounds, namely, polythiols such as the sulfur analogs of the polyols listed in section (4) above, phenol-aldehyde condensates, urea-aldehyde condensates, melamine-aldehyde condensates, polyamines, polycarboxylic acid halides, and the like.

A preferred class polymers are those prepared from mixtures of (a) a poly(epoxyalkyl-2-oxazolidinone), e.g., as illustrated in Formula A and Formula B hereinbefore; with (b) a phenolic based polyepoxide such as epichlorohydrin adducts of bisphenol A, i.e., bis(4-hydroxyphenyl)dimethylmethane, e.g., the diglycidyl ether of bisphenol A; epichlorohydrin adducts of bisphenol F [bis(4-hydroxyphenyl)methane]; and epoxylated novolac resins; and (c) a cross-linking type of curing or hardening agent such as the poly-functional amines which are mentioned in numbered paragraph (1) of the resinous copolymer compositions or the polycarboxylic acid anhydrides mentioned in numbered paragraph (3) of the resinous copolymer compositions. In this preferred class of polymers the ratio, by weight, of poly(epoxyalkyl-2-oxazolidinone) to the phenolic based polyexpoxide can vary over a broad range such as that of 10 to 1 and 1 to 10. Preferably, however, the ratio of these various epoxide reactants varies from about 0.2 to 5 parts of the poly(epoxyalkyl-2-oxazolidinone) for each part by weight of the phenolic based polyepoxide resin. The curing or hardening agent is preferably employed in about stoichiometric quantities, i.e., a quantity providing one active epoxy reactive site, e.g., hydrogen, of the curing agent for each epoxy group, although this can be varied as is customary in the art, e.g., to provide about 0.5 to 2 active sites for each epoxy group. The preferred curing agents are the polyfunctional amines and particularly aminoethylpiperazine. The preferred phenolic based polyepoxides are liquids, including very viscous sluggish liquids. This preferred class of polymers, when cured with the polyfunctional amines, has many advantageous properties. Illustrative of such advantageous properties there can be mentioned: high elongation, high tensile strength, impact resistance, room temperature cures, resistance to tearing or breaking, good electrical properties, e.g., dielectric constant dissipation factor, and dielectric strength, resistance to cracking or breaking due to temperature changes, good resistance to various solvents, e.g., water, hexane and alkalies, such as sodium hydroxide.

This invention also contemplates epoxyoxazolidinone compounds which contain only one epoxy group. These compounds can be produced by the dehydrohalogenation of a (beta-haloalkylurethano)halohydrin as illustrated by the following reaction scheme:

$$CH_2=CHCH_2NCO + ClCH_2CHOHCHOHCH_2Cl \longrightarrow$$

$$CH_2=CHCH_2NHCO_2\overset{|}{C}HCHOHCH_2Cl \xrightarrow{-2HCl}$$

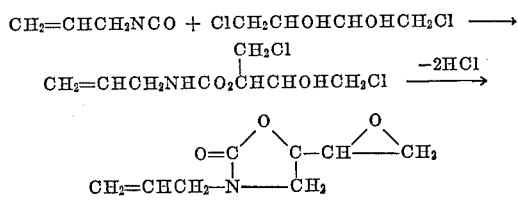

The 3 - allyl - 5 - epoxyethyl - 2 - oxazolidinone illustrated above is a unique type of compound which can be polymerized either through the epoxy group or the vinyl group. Once the compound is polymerized (e.g., through the vinyl group), the remaining reactive site in the molecule (e.g., the epoxy group) can serve as a cross-linking means to produce a more thermoset resin.

In comparison to epoxyoxazolidinones prepared by the direct condensation of epoxides and isocyanates, the process of the present invention minimizes many of the side reactions characteristic of epoxide and isocyanate chemistry, such as homopolymerization of the epoxy groups, and carbodiimide formation and trimerization of the isocyanato groups.

The following examples will serve to illustrate specific embodiments of the present invention.

EXAMPLE 1

Poly(epichlorohydrin)[1] (95 grams) having an average molecular weight of 450 was mixed with dioxane (180 grams) and 2,4-tolylene diisocyanate (17.4 grams). Stannous octoate (0.4 milliliter) was added and the mixture was stirred and kept at 25° to 30° C. overnight. The reaction mixture was added dropwise, with efficient agitation, to 240 grams of 10 percent sodium hydroxide solution at 70° to 75° C. and was allowed to stir for one hour. Four hundred grams of water was added and the lower (organic) layer was separated, dissolved in toluene, and washed with water. The toluene solution was dried over anhydrous sodium sulfate, filtered, and concentrated in vacuo to yield an epoxyoxazolidinone having a viscosity of 24,000 cps. at 25° C. (Brookfield). The product contained 2.05 percent oxirane oxygen.

EXAMPLE 2

Poly(epichlorohydrin) (189 grams) having an average molecular weight of 900, containing 3.66 percent OH functionality, was mixed with dioxane (180 grams) and 2,4-tolylenediisocyanate (17.4 grams). The mixture was stirred, stannous octoate (0.4 milliliter) was added, and the reaction temperature was maintained at 25° to 30° C. overnight. The reaction mixture was added dropwise with efficient agitation at 70° to 75° C. to 240 grams of 10 percent sodium hydroxide solution and allowed to stir for one hour. Two hundred and sixty grams of water was added and the lower (organic) layer was separated, dissolved in toluene and washed with water. The toluene solution was dried over sodium sulfate, filtered, and concentrated in vacuo yielding a viscous oil which contained 1.44 percent oxirane oxygen and 28.2 percent chlorine.

EXAMPLE 3

Two hundred and forty-two grams of a poly(epichlorohydrin) (242 grams) of an average molecular weight of 1150 was mixed with dioxane (200 grams) and 2,4-tolylene diisocyanate (17.4 grams). This mixture was stirred and 0.4 milliliter of stannous octoate was added. The reaction mixture was kept at 25° to 30° C. overnight and was then added dropwise, with efficient agitation, to 240 grams of 10 percent sodium hydroxide solution at 70° to 75° C. Stirring was continued for one hour. Four hundred grams of water was added and the lower (organic) layer was separated, dissolved in toluene, and washed with water. The toluene solution was dried over anhydrous sodium sulfate, filtered, and concentrated in vacuo to give an oil having a viscosity of 19,700 cps. at 25° C. (Brookfield). It contained 1.25 percent oxirane oxygen and 27.63 percent chlorine.

Resins 1, 2, and 3—Sample curing recipe

20%—17.0 g. Epon 828[2] _____ 0.05 M.
80%—68.0 g. Product of Examples
  1, 2, or 3 _____ 0.03 M.
  3.36 g. Diethylenetriamine _ 0.16 equiv.
                              (aminohydrogen).

60° C.—15 hours.

[2] Diglycidyl ether of bisphenol A, sold by Shell Chemical Company.

Resins 1, 2, and 3 cured at 60° C. to give flame-resistant flexible polymers. Flexible, elastomeric resins were obtained with 2 and 3.

EXAMPLE 4

A mixture of 28 grams of tolylene diisocyanate (80/20—2,4/2,6-isomers) and 200 grams of polypropylene glycol having an average molecular weight of 2,000 was heated and maintained at 120° to 130° C. for three hours with stirring. It was then cooled to 25° C. and a solution of 95 grams of isopropylidene bis [1-(phenyleneoxy)-3-chloro-2-propanol] in 95 grams of methylene chloride was added. The mixture was stirred, 0.3 milliliter of stannous octoate added, and allowed to stand overnight. It was then added, over the course of one hour, to 500 grams of 10 percent aqueous sodium hydroxide solution with efficient stirring at 80° to 90° C. The mixture was stirred for thirty minutes after the addition was completed. The resulting viscous, resinous product was washed with water and dried.

The resinous product was divided into portions and cured using various organic anhydride and amine hardeners.

CURING CONDITIONS (ANHYDRIDES)

| Hardener | Gms.[1] per 100 gms. resin | Cure Schedule | |
|---|---|---|---|
| Hexahydrophthalic anhydride | 19 | 101° C./8 hours | Tough, rubbery polymer. |
| Methylnadic anhydride | 22 | do | Do. |
| Dodecenylsuccinic anhydride | 50 | do | Soft, rubbery polymer. |

[1] Plus 1 percent dimetnylbenzylamine accelerator.

CURING CONDITIONS (AMINES)

| Hardener | Gms. per 100 gms. resin | Cure Schedule | |
|---|---|---|---|
| Diethylene triamine | 5 | 30-35° C./8 hours | Elastic polymer. |
| Shell curing agent U [1] | 20 | do | Tough, elastic polymer. |
| Shell curing agent U [2] | 20 | 101° C./8 hours | Flexible polymer. |

[1] Liquid amine; epoxy adduct of diethylenetriamine and Epon 828.
[2] Liquid tertiary amine salt.

Two grams of Shell Curing Agent U was thoroughly mixed with 10 grams of the resin of Example 4. The resulting mixture increased in viscosity as the mixing was continued and was drawn into the form of a continuous fiber. This was allowed to cure at 35° C. for eight hours. A tough, elastic fiber was obtained.

EXAMPLE 5

Tolylene diisocyanate (17 grams) was mixed with 85 grams of methylene chloride and 85 grams of isopropylidene bis-[1-(phenyleneoxy)-3-chloro-2-propanol]. The mixture was stirred until a homogeneous solution was obtained and 0.4 milliliter of stannous octoate was added. Cooling was required to maintain the temperature below 35° C. The mixture was allowed to stand overnight at 25° to 30° C. It was then added, over a period of one hour, to 600 grams of 10 percent aqueous sodium hydroxide solution with efficient stirring. The white, solid resin which was obtained was removed by filtration, washed thoroughly with water, and dried.

Ten grams of the solid resin was dissolved in 40 grams of methyl isobutyl ketone. Two grams of Shell Curing Agent U was added and the solution was poured into a sheet of Teflon to form a film. After evaporation of the solvent, the film was cured at 100° C. for four hours. A hard, glossy film was obtained.

EXAMPLE 6

Epichlorohydrin (200 grams) was added slowly with stirring at 65° C. to a mixture of 1.5 grams of boron trifluoride etherate in 400 grams of polyethylene glycol having an average molecular weight of 400. The addition required thirty minutes and cooling was necessary to maintain the temperature in the range of 60° to 70° C. After the addition was complete, the mixture was stirred and kept at 65° to 70° C. for one hour. One hundred and seventeen grams of the reaction product was mixed with 200 grams of methylene chloride and 105 grams of Multhrathane F-84 (an isocyanate terminated polyether urethane prepolymer containing 6.5 to 7.0 percent NCO). One milliliter of stannous octoate was added and the mixture was kept at 25° to 30° C. overnight. The resulting product was added dropwise with efficient agitation to 240 grams of 10 percent aqueous sodium hydroxide solution at 70° to 75° C. and was allowed to stir for one hour. Four hundred grams of water was added and the lower (organic) layer was separated, washed thoroughly with water, and dried under vacuum. The product contained 1.1 percent oxirane oxygen. It was mixed with 20 percent Epon 828 and cured at 60° C. with diethylenetriamine, aminoethylpiperazine, and Shell Curing Agent U. Diethylenetriamine (at a concentration of 1 amino hydrogen per epoxy group) yielded "snappy" rubbers. Aminoethylpiperazine curing afforded rubbers having slow recovery.

Chemical resistance tests

Cured, rubber-like polymers obtained from the products of (1) Example 2 cured with Shell Curing Agent U and (2) Examples 6 cured with diethylenetriamine were compared with a commercial urethane elastomer (3) Seilon UR–80–T (Seiberling Rubber Company) for resistance to hydrolytic degradation. The above samples were heated for sixteen hours at 70° C. with 10 percent hydrochloric acid. Sample (1) was unchanged in appearance, the acid solution was colorless. Sample (2) was unchanged in appearance, the solution turned yellow. Sample (3), the commercial urethane elastomer, showed definite checking and flaking, the solution turned green. Samples of the three materials were heated with 10 percent hydrochloric acid and also with 10 percent aqueous sodium hydroxide solution for eighty-eight hours at 70° C.

| | Sample | | | | | |
|---|---|---|---|---|---|---|
| | (1) | | (2) | | (3) | |
| | 10% HCl | 10% NaOH | 10% HCl | 10% NaOH | 10% HCl | 10% NaOH |
| Original weight | 1.4527 | 1.6013 | 1.1193 | 0.9550 | 1.6465 | 1.5483 |
| Final weight | 1.5638 | 1.6430 | 1.6125 | 1.2120 | 0.8210 | 1.2874 |
| Percent change | +8% | +3% | +43% | +25% | −50% | −17% |

EXAMPLE 7

Poly(epichlorohydrin) (190 grams) having an average molecular weight of 450, was mixed with methylene chloride (300 grams) and hexamethylene diisocyanate (33.6 grams). One milliliter of a stannous alkanoate catalyst (Metal and Thermit T–9 catalyst) was added and the mixture was stirred and kept at 25° to 30° C. overnight while being protected from atmospheric moisture by means of a drying tube. The reaction mixture was added dropwise, with efficient agitation, to 480 grams of 10 percent aqueous sodium hydroxide solution at 70° to 75° C. and was allowed to stir at this temperature for one hour. Five hundred grams of water was added and the lower (organic) layer was separated, dissolved in toluene, and washed with water. The toluene solution was dried by azeotropic distillation of the water followed by concentration in vacuo to give a viscous liquid. Curing in the presence of 10 percent diethylenetriamine at 60° C. overnight yielded a rubber-like polymer.

EXAMPLE 8

Poly(epichlorohydrin) (190 grams) having an average molecular weight of 450, was mixed with methylene chloride (300 grams) and p,p'-diphenylmethane diisocyanate (50 grams). One milliliter of stannous octoate was added and the mixture was stirred and kept at 25° to 30° C. overnight under a dry atmosphere. The reaction mixture was then added dropwise, with efficient agitattion, to 480 grams of 10 percent aqueous sodium hydroxide solution at 70° to 75° C. and was allowed to stir at this temperature for one hour. Five hundred grams of water was added and the lower (organic) layer was separated, dissolved in toluene, and washed with water. The toluene solution was dried and concentrated in vacuo to give a viscous liquid. Curing with 10 percent diethylenetriamine at 60° C. overnight yielded a flexible polymeric material.

EXAMPLE 9

One milliliter of boron trifluoride-etherate was mixed with trimethylolpropane (45 grams) at a temperature of 65° C. Epichlorohydrin (200 grams) was added dropwise with stirring and with cooling to maintain the temperature in the range of 60° to 65° C. The mixture was stirred for one hour after the addition was complete.

Tolylene diisocyanate (18 grams) was added to a solution of polypropylene glycol (200 grams, approximate molecular weight of 2,000) in 150 grams of methylene chloride and 1.5 milliliters of dibutyltin dilaurate was added. The mixture was stirred and allowed to stand for two hours while being protected from atmospheric moisture.

Seventy-five grams of the epichlorohydrin adduct (6/1) of trimethylolpropane was added to the isocyanato polyurethane prepolymer and the mixture was stirred and allowed to stand for sixteen hours.

The reaction mixture was then added dropwise with vigorous agitation to 600 grams of 10 percent aqueous sodium hydroxide solution at a temperature of 65° to 70° C. over a period of one hour. After the addition was completed, the mixture was stirred at 65° to 70° C. for an additional forty-five minutes. The aqueous layer was separated and the viscous residue was washed with water, dissolved in methylene chloride and washed with water containing dissolved $CO_2$ until the pH of the wash water had dropped to 8.0. The methylene chloride solution was dried over anhydrous sodium sulfate, and distilled in vacuo to remove methylene chloride. The viscous, yellow epoxyoxazolidinone which was obtained weighed 145 grams and had an oxirane oxygen content of 1.80 percent.

Curing of the epoxyoxazolidinone

Twenty grams of the epoxyoxazolidinone prepared above was mixed with 5 grams of methylnadic anhydride (National Aniline Division, Allied Chemical and Dye Corporation) and 6 drops of benzyldimethylamine. The mixture was cured at 100° C. for two hours to yield a rubbery material having a Shore Durometer A hardness of 60.

Epoxyoxazolidinone as a plasticizer

Two grams of the epoxyoxazolidinone was dissolved in 5 grams of acetone and added to 20 grams of a solution polymer of 1/1 ethyl acrylate/methyl methacrylate in toluene (33 percent solids). A film formed upon evaporation of the solvent was colorless and transparent and exhibited greater flexibility than a film formed from the 1/1 ethyl acrylate/-methyl methacrylate itself.

Epoxyoxazolidinones are also useful as plasticizers for poly(vinyl chloride) and other vinyl halide resins, and for commercial epoxy resins.

The epoxyoxazolidinones have further use as cross-linking agents for acrylic and other polymers containing reactive groups such as —SH, —OH, —COOH, anhydrides or amines to impart toughness, solvent resistance and abrasion resistance to films and coatings. For example, a styrene/alkyl acrylate/methacrylic acid polymer or a styrene/butadiene/acrylic acid polymer or a vinyl acetate/acrylic acid polymer are readily cross-linked with the invention poly(epoxyalkyl-2-oxazolidione) to impart properties which qualify the resins for application as film forming protective coatings. The invention poly(epoxyalkyl-2-oxazolidinone) compounds can be advantageously incorporated as a component in latex paints.

EXAMPLE 10

Twelve grams of phenylisocyanate was mixed with 41.5 grams of isopropylidene bis[1 - (p - phenyleneoxy)-3-chloro-2-propanol], 41.5 grams of methylene chloride and 0.5 cc. of stannous octoate. The mixture was allowed to stand for sixteen hours at room temperature.

Over a period of one hour, the resulting solution was added to a mixture of 30 grams of sodium hydroxide (97.8 percent pellets) in 300 grams of dioxane at 70° to 75° C. with stirring. Stirring was continued for an additional one-hour period. The reaction mixture was cooled, neutralized with carbon dioxide and filtered. The filtrate was distilled to dryness in vacuo. The epoxyoxazolidinone product was obtained in the form of a viscous, yellow syrup.

EXAMPLE 11

Dioxazolidone diepoxide from polyethylene glycol 200

Polyethylene glycol having a molecular weight of 200 (400 g.) and boron trifluoride etherate (0.5 ml.) were placed in a 1000 ml. 3-neck flask; controlling the temperature of the reaction at 85° C. added epichlorohydrin (372 g.) dropwise. After the addition was complete and no further exotherm developed the temperature was raised to 95° C. for 30 minutes. The excess catalyst was neutralized with calcium oxide (12 g.).

Analysis of the dichlorohydrin:
  Theory—Cl, 18.3%; OH, 8.8%
  Found—Cl, 17.95%; OH, 9.12%

To the above dichlorohydrin (385 g.) was added dichloroethane (300 ml.) and stannous octoate catalyst (0.5 ml.) in a 1000 ml. 3-neck flask; with stirring, added tolylene diisocyanate (2,4-2,6) (78.3 g.), controlling the temperature between 5–10° C. for 3 hours and then allowing the temperature to climb to room temperature overnight. The di(beta-haloalkylurethano)dihalohydrin thus formed was then treated with sodium hydroxide (88 g.). The reaction temperature was controlled at 70° C. and allowed to run with vigorous stirring for 2½ hours at which time it was cooled and the excess alkali neutralized with carbon dioxide. The solids were filtered off and the filtrate of dioxazolidinone diepoxide was concentrated to a syrup having the following properties:

Analysis:
    Theory—Cl, 0.0%; oxirane, 3.7%
    Found—Cl, 3.7%; oxirane, 3.7%

Viscosity: 4,600 cps. at 25° C.

Physical properties: Blend of the diepoxide and Epon 828 with N-aminoethylpiperazine Cure cycle—1 week at 22° C.:
    3/1 ratio: Tensile (p.s.i.) 1300; elongation (percent) 129
    2/1 ratio: Tensile (p.s.i.) 2600; elongation (percent) 90
    1/1 ratio: Tensile (p.s.i.) 4550; elongation (percent) 27

Cure cycle—1 week at 105° C.:
    3/1 ratio: Tensile (p.s.i.) 4050; elongation (percent) 151
    2/1 ratio: Tensile (p.s.i.) 5700; elongation (percent) 105
    1/1 ratio: Tensile (p.s.i.) 5650; elongation (percent) 8

EXAMPLE 12

Dioxazolidone diepoxide from polypropylene glycol 200

Example 11 is followed with the exception that in place of polyethylene glycol 200, an equal molar amount of polypropylene glycol 200 is employed. The dioxazolidinone diepoxide thus formed had the following properties:

Analysis:
    Theory—Cl, 0.0%; oxirane, 4.0%
    Found—Cl, 3.5%; oxirane, 3.75%

Viscosity: 11,400 cps. at 25° C.

Physical properties: Blend as in Example 11 (i.e., parts, by weight, of dioxazolidone diepoxide to Epon 828)

Cure cycle—1 week at 22° C.:
    3/1 ratio: Tensile (p.s.i.) 3150; elongation (percent) 164
    2/1 ratio: Tensile (p.s.i.) 4450; elongation (percent) 94

Cure cycle—1 week at 105° C.:
    3/1 ratio: Tensile (p.s.i.) 4300; elongation (percent) 27
    2/1 ratio: Tensile (p.s.i.) 3500; elongation (percent) 8

EXAMPLE 13

Dioxazolidone diepoxide from polypropylene glycol 710 (ml. wt. 775)

Example 11 is followed with the exception that in place of polyethylene glycol 200, an equal molar amount of polypropylene glycol 710 is employed. The dioxazolidone diepoxide had the following properties:

Viscosity: 1,400 cps. at 25° C.

EXAMPLE 14

Dioxazolidone diepoxide from polypropylene glycol 1010 (ml. wt. 950)

Example 11 is followed with the exception that in place of polyethylene glycol 200, an equal molar amount of polypropylene glycol 1010 is employed. The dioxazolidone diepoxide had the following properties:

Analysis:
    Theory—Cl, 0.0%; oxirane, 1.32%
    Found—Cl, 2.42%; oxirane, 1.30%

Viscosity: 1,400 cps. at 25° C.

Physical properties: Blend as in Example 11

Cure cycle—4 hours at 70° C.:
    3/1 ratio: Tensile (p.s.i.) 100; elongation (percent) 60; Shore D 5
    2/1 ratio: Tensile (p.s.i.) 200; elongation (percent) 35; Shore D 6
    1/1 ratio: Tensile (p.s.i.) 460; elongation (percent) 20; Shore D 16

EXAMPLE 15

Dioxazolidone diepoxide from hexane 1,6-diol

Example 11 is followed with the exception that in place of polyethylene glycol 200, an equal molar amount of hexane 1,6-diol is employed. The dioxazolidone diepoxide thus formed had the following properties:

Analysis:
    Theory—Cl, 0.0%; oxirane, 5.36%
    Found—Cl, 4.38%; oxirane, 3.98%

EXAMPLE 16

Dichlorohydrin from poly(oxypropylene) glycol and epichlorohydrin

Polypropylene glycol 300 (293 g.) and boron trifluoride etherate (0.5 ml.) were placed in a 3-neck round-bottom flask. Controlling the temperature of reaction between 78–80° C. added slowly, epichlorohydrin (194 g.). After addition was completed the temperature was raised to 90° C. for 30 minutes. The excess catalyst was neutralized with calcium oxide (6 g.). The analysis of the dichlorohydrin thus formed was as follows:

Analysis:
    Theory—Cl, 14.5%; OH, 7.2%
    Found—Cl, 15.4%; OH, 6.81%

EXAMPLE 17

Di($\beta$-chloromethylurethano) dichlorohydrin (A) The dichlorohydrin of Example 16 (129 g.), dichloroethane (130 ml.) and stannous octoate catalyst (0.1 ml.) were placed in a 3-neck round-bottom flask. With stirring, added tolylene diisocyanate (2,4–2,6) (19.14 g.) controlling the temperature between 5–10° C. The temperature was allowed to come to room temperature overnight. The di($\beta$-chloromethylurethano) dichlorohydrin thus formed had the following properties:

Analysis:
    Theory—Cl, 12.9%; OH, 5.8%
    Found—Cl, 13.9%; OH, 5.38%

Viscosity: 3,750 cps. at 25° C.

(B) The dichlorohydrin (Example 16) (129 g.) and tolylene diisocyanate (2,4–2,6) (19.14 g.) were placed in a 3-neck round-bottom flask and with stirring, heated at 100° C. for 5 hours. The di($\beta$-chloromethylurethano) dichlorohydrin thus formed had the following properties:

Analysis: Found—Cl, 13%; OH, 3.57%; N, 2.54%

EXAMPLE 18

Dioxazolidone diepoxide (A) To the di($\beta$-chloromethylurethano) dichlorohydrin [Example 17(A)] in dichloroethane was added sodium hydroxide. The temperature was controlled between 70–80° C. and allowed to stir for 2 hours, at which time the mixture was cooled and the excess alkali neutralized with carbon dioxide. The solids were filtered off and the filtrate concentrated to an amber syrup of the dioxazolidone diepoxide having the following properties:

Analysis: Found—Cl, 2.6%; oxirane, 3.5%

Viscosity: 4,070 cps. at 25° C.

$n_D^{25} = 1.4868$

Physical properties: Blend as in Example 11

Cure cycle 1 week at 22° C.:
    2/1 ratio: Tensile (p.s.i.) 2,800; elongation (percent) 162.5; Shore D, 50; water resistance, 10.3%

Electrical:
  Capacitance
    1 kc., 16.75
    100 kc., 14.38
  Dielectric constant
    1 kc., 4.13
    100 kc., 3.54
  Dissipation factor
    1 kc., 0.046
    100 kc., 0.040
Cure cycle, 1 week at 105° C.:
  2/1 ratio: Tensile (p.s.i.) 4350; elongation (percent) 145; Shore D, 67; water resistance, 16.1%
Electrical:
  Capacitance
    1 kc., 15.84
    100 kc., 14.18
  Dielectric constant
    1 kc., 3.94
    100 kc., 3.52
  Dissipation factor
    1 kc., 0.032
    100 kc., 0.028

(B) the di($\beta$-chloromethylurethano) dichlorohydrin [Example 17(B)] in dichlorohydrin was treated the same as in Example 18(A). It had the following properties:

Analysis: Found—Cl, 2.94%; oxirane, 3.5%
Viscosity: 4,340 cps. at 25° C.; $n_D^{25}$ 1.4870
Physical properties: Blend as in Example 11
Cure cycle, 1 week at 22° C.:
  2/1 ratio: Tensile (p.s.i.) 3300; elongation (percent) 150; Shore D, 55; water resistance, 13.2%
Electrical:
  Capacitance
    1 kc., 17.73
    100 kc., 15.59
  Dielectric constant
    1 kc., 4.02
    100 kc., 3.53
  Dissipation factor
    1 kc., 0.034
    100 kc., 0.038
Cure cycle, 1 week at 105° C.:
  2/1 ratio: Tensile (p.s.i.) 3850; elongation (percent) 106.5; Shore D, 72; water resistance, 18.1%
Electrical:
  Capacitance
    1 kc., 16.17
    100 kc., 14.55
  Dielectric constant
    1 kc., 3.86
    100 kc., 3.48
  Dissipation factor
    1 kc., 0.027
    100 kc., 0.028

EXAMPLE 19

Dioxazolidone tetra-epoxide from triol 740 (M. W. 732)

Triol 740[3] (732 g.) (1 M) boron trifluoride etherate (0.5 ml.) were placed in a 3-neck round-bottom flask. Epichlorohydrin (370 g.) (4 M) was slowly added, controlling the temperature at 80° C. The excess catalyst was neutralized by calcium oxide.

To 888 g. of the above mixture of the epichlorohydrin adduct of the triol was added dichloroethane (600 ml.) and stannous octoate catalyst (0.5 ml.). With stirring added tolylene diisocyanate (55.6 g.) (0.32 M), controlling the temperature between 5–10° C. and allowing the temperature to climb to room temperature overnight. The mixture containing the poly(beta-haloalkylurethano) halohydrin was then treated with sodium hydroxide (105 g.) and the temperature controlled between 70–80° C. to form the dioxazolidone tetra-epoxide. Cooled the reaction and neutralized the excess alkali with carbon dioxide. Filtered and removed solvent. This tetraepoxide had the following properties:

Analysis: Found—Cl, 2.9%; oxirane, 2.7%
Viscosity: 1,876 cps. at 25° C.
Physical properties: Blend as in Example 11

Cure cycle, 1 week at 25° C.:

3/1 ratio: Tensile (p.s.i.) 400; elongation, (percent) 66; Shore A, 67.
  2/1 ratio: Tensile (p.s.i.) 1000; elongation (percent) 82; Shore D, 25.
  1/1 ratio: Tensile (p.s.i.) 3150; elongation (percent) 55; Shore D, 59.

Cure cycle, 1 week at 105° C.:
  3/1 ratio: Tensile (p.s.i.) 640; elongation (percent) 82; Shore D, 22.
  2/1 ratio: Tensile (p.s.i.) 2000; elongation (percent) 89; Shore D, 36.
  1/1 ratio: Tensile (p.s.i.) 4200; elongation (percent) 27; Shore D, 70.

EXAMPLE 20

Dioxazolidone tetra-epoxide from triol 4542

(M.W. ca. 4500)

Triol 4542[4] (1125 g.) (0.25 M) and boron trifluoride etherate were placed in a 3-neck round-bottom flask. Epichlorohydrin (92.5 g.) (1 M) was added, controlling the temperature at 80° C. The excess acid was then neutralized by adding calcium oxide. To the mixture (1137 g.) was added dichloroethane (900 ml.), stannous octoate catalyst (0.4 ml.) and tolylene diisocyanate (2,4-2,6) (19.01 g.) (0.11 M). After condensation was complete the reaction mixture was treated with sodium hydroxide (30.3 g.), controlling the temperature between 70–80° C. to form the dioxazolidone tetra-epoxide. Cooled reaction and neutralized excess alkali with carbon dioxide. Filtered and removed solvent. This tetra-epoxide had the following properties:

Analysis: Found—Cl, 2.31%; oxirane, 0.57%
Viscosity: 2,400 cps. at 25° C.

EXAMPLE 21

Dioxazolidone diepoxide-epoxy novolac resin compositions cured with nadic methyl anhydride Epoxide equivalent weight of Dow epoxy novolac resin DEN 438:179. Viscosity of DEN 438 epoxy novolac resin: 19,000,000 cps. at 25° C. (approximate). The dioxazolidone diepoxide employed, referred to herein as DDP, was substantially the same as that prepared in Example 18(A). Oxirane found in DDP—3.40%—epoxy equivalent weight: 471. Viscosity of DDP: 5100 cps. at 25°C. Anhydride equivalent weight (molecular weight) of Nadic methyl anhydride (NMA): 178.

The following table shows various formulations, curing conditions, and properties of resins produced from the above ingredients.

---

[3] Triol 740: Trimethylolpropane-propylene oxide condensates of approximately 700 molecular weight.

[4] Triol 4542 Trimethylolpropanepropylene oxide condensates of approximately 4500 molecular weight.

| Control formulation | Cure | Tensile | Percent elong. | Shore D hardness | Percent water abs. 7 days |
|---|---|---|---|---|---|
| (1) DEN, 438, 100 g. <br> NMA[1], 89.5 g. <br> BDMA, 1.0 g. | 24 hrs. at 90° C. plus 48 hrs. at 125° C. | 1,550 | 0.5 | 90 | 0.5 |
| (2) DDP, 30 g. <br> DEN, 438, 70 g. <br> NMA[1], 73 g. <br> BDMA, 1.0 g. | 24 hrs. at 90° C. plus 48 hrs. at 125° C. | 8,500 | 3.0 | 88 | 0.5 |
| (3) DDP, 50 g. <br> DEN, 438, 50 g. <br> NMA[1], 62 g. <br> BDMA, 1.0 g. | 24 hrs. at 90° C. plus 48 hrs. at 125° C. | 9,850 | 3.8 | 84 | 0.5 |
| (4) DDP, 66 g. <br> DEN, 438, 33 g. <br> NMA[1], 52 g. <br> BDMA, 1.0 g. | 24 hrs. at 90° C. plus 48 hrs. at 125° C. | 6,800 | 4.25 | 82 | 0.7 |

[1] 0.90 anhydride equivalent per epoxide equivalent BDMA = Benzyldimethylamine.

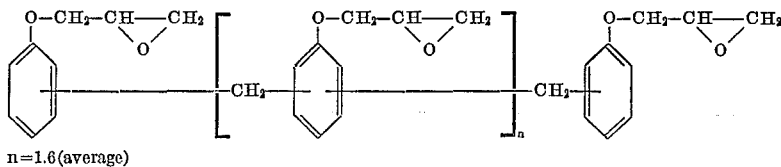

n = 1.6 (average)

Procedure for making cured castings

The very viscous epoxy novolac resin was heated to 90° C. in an oven to reduce its viscosity so that it could be poured. All of the ingredients of each formulation were weighed into a 250 ml. 3-neck round-bottom flask. Each mixture was degassed by stirring and heating under vacuum until the temperature of the mixture reached 85° C. (approximately 10 minutes of stirring and heating). Then immediately the mixture was poured into a 1/8″ thick Teflon coated flat panel mold which had been preheated in an oven to 90–100° C. The pouring was done carefully so as not to entrap air. The formulation was then cured as shown above. The first 90° C. portion of the cure was carried out in the mold. The solid casting was then removed from the mold before the second 125° C. stage of the cure.

TABLE I.—CHEMICAL AND SOLVENT RESISTANCE OF DDP EPON 828 (2/1)

| | Percent change in weight | |
|---|---|---|
| Chemical or solvent | 2/1 DDP/ Epon 828 | 2/1 Epon 871+/ Epon 828 [1] |
| 20% sodium hydroxide | 3 | 33 |
| Toluene | 47 | 55 |
| Acetone | 26 | 30 |
| Carbon tetrachloride | 30 | 89 |
| Hexane | 0.1 | 9 |
| Water | 9 | 2 |

[1] With aminoethylpiperazine curing agent, 7 days at room temperature (RT).
+Epon 871 represents the standard, diglycidyl ester of dimer acid. Dimer acid is a $C_{18}$ unsaturated fatty acid which has been dimerized containing at least one ethylenic double bond.

TABLE II.—BASIC FORMULA (2/1 DDP/EPON 828). CURING AGENT IN STOICHIOMETRIC RATIO, CURING CONDITION 73° F./50% RELATIVE HUMIDITY

| Curing Agent | AEP (amino-ethyl piperazine) | Diethylene-triamine | Meta-xylene diamine | Propane-diamine | Bis-(amino-propyl) piperazine | 1,4-cyclo-hexane bis-(methyl-amine) |
|---|---|---|---|---|---|---|
| Tensile, 1 week | 2,550±0 [1] (2,200±200) | 1,850±50 | 2,050±150 (1,000±100) | 950±50 | 1,750±150 | 2,100±0 |
| Percent elongation | 149+1.5 (73±6) | 62 | 120.5±1 (56.5±2.5) | 84±3 | 92.5 | 80.8±1.3 |
| Tensile, 1 week plus 48 hrs. at 105° C | 4,400 | 4,500±0 | 3,700±300 (2,500±0) | 3,200±100 | 3,300±100 | 3,700 |
| Percent elongation | 116 | 71±1.5 | 59.5±8 (69.5±1) | 72.5+6 | 67.5±5.5 | 30 |
| Shore hardness 48 hrs. at RT | 50-33 (40-29) | 40-27 | 50-33 (45-34) | 45-30 | 40-25 | Too soft |
| Shore hardness 1 week at RT | 62-50 | 62-49 | 50-35 (45-30) | 50-35 | 58-45 | 65-53 |
| Capacitance: | | | | | | |
| 1 kc | 16.47 (15.49) | 19.32 | 19.61 (17.33) | 10.67 | 20.78 | 17.34 |
| 100 kc | 14.37 (14.03) | 16.37 | 16.97 (14.80) | 17.27 | 17.22 | 15.18 |
| Dielectric constant: | | | | | | |
| 1 kc | 4.09 (3.48) | 4.50 | 4.37 (4.08) | 4.52 | 4.47 | 4.08 |
| 100 kc | 3.57 (3.16) | 3.81 | 3.27 (3.48) | 3.78 | 3.71 | 3.57 |
| Dissipation factor: | | | | | | |
| 1 kc | 0.044 (0.033) | 0.0516 | 0.0481 (0.047) | 0.076 | 0.074 | 0.043 |
| 100 kc | 0.040 (0.029) | 0.050 | 0.0441 (0.033) | 0.054 | 0.045 | 0.036 |
| Volume resistivity, ohm/cm | $1.4 \times 10^{13}$ | | | | | |

[1] Figures in parenthesis are the values for Epon 871 used as standard.

EXAMPLE 22

Diurethane diepoxide-phenolic resin coating vehicles

The diurethane diepoxide used in the following coating formulations was made from a 1.00/2.07/2.4 molar ratio of Pluracol P–2010 (polypropylene glycol of 2000 molecular weight)/TDI/bis[p,p' - (3 - chloro - 2 - hydroxy - 1 - oxypropyl)phenyl] isopropylidene. This diepoxide is referred to in this example as DD.

Oxirane found in diurethane-diepoxide (based on 100% of said material—no solvent): 1.84%; total chlorine found: 16.2%; active chlorine found (hydrolyzable by $NaHCO_3$— chlorohydrin chlorine): 0.68%.

The following coating vehicle solutions were made and were coated on cleaned steel panels:

The amounts of the ingredients are parts by weight.

coating formulations. The angles of bend are the angular deviations of the bent panels from the original flat shapes.

Procedure for synthesis of the DD used in the above DD-phenolic resin coating vehicles:

Ingredients:
- Pluracol P–2010 (polypropylene glycol-200 M.W.) _____ 0.10 mole, 200 gms.
- TDI (tolylene diisocyanate) __ 0.207 mole, 36.0 gms.
- Stannous octoate catalyst (stabilized) _____ 2.0 ml.
- Bis[p,p' - (3 - chloro-2-hydroxy-1 - oxy-propyl)phenyl]isopropylidene _____ 0.24 mole, 100 gms.
- Ethylene dichloride solvent ___ 200 gms.

|  | Formulation No. | | | | | | |
| --- | --- | --- | --- | --- | --- | --- | --- |
|  | [1]1 | 2 | 3 | 4 | 5 | 6 | [1]7 |
| Durez 15959 phenolic resin | 25.0 | 25.0 | 33 | 49 | 60 | 75 | 100 |
| Epon 1007 solid epoxy resin | 75.0 | | | | | | |
| DD solution (81.3% solids in ethylene dichloride solvent) | | 92.5(75.0) | 83(67) | 63(51) | 50(40) | 30.7(25) | |
| Phosphoric acid, 9.6% solution of 85% $H_3PO_4$ in n-butanol | 15.4 | 15.2 | 15.1 | 15.5 | 14.9 | 15.2 | 15.2 |
| "Cellosolve" acetate | 67 | 67 | 67 | 63 | 69 | 69 | 45 |
| Toluene | 67 | 67 | 67 | 63 | 71 | 71 | 45 |
| Percent solids (total of epoxy material) | 41 | 38 | 38 | 40 | 38 | 39 | 49.5 |

[1] Control.

Pencil hardness data for the cured coatings:

|  | [1]1 | 2 | 3 | 4 | 5 | 6 | [1]7 |
| --- | --- | --- | --- | --- | --- | --- | --- |
| Weight ratio Durez phenolic resin/DD | 25/75 | 25/75 | 33/67 | 49/51 | 60/40 | 75/25 | 100/0 |
| Pencil hardness | <1H | <1H | <1H | <1H | <1H | 1H | 4H |

[1] Control.

1 (harder than coatings from formulations #2, 3 and 4) Bending test results for the coatings on the steel panels. Panels were bent to elongate the coatings.

| Formulation No.: | App. angle of bend | Coating cracked | Coating not cracked |
| --- | --- | --- | --- |
| 1 | 35° | X | |
| 2 | 90° | | X |
| 3 | 90° | | X |
| 4 | 0° | | X |
| 5 | 30° | X | |
| 6 | 25° | X | |
| 7 | (Very brittle coating. Cracked during cooling after removal from curing oven.) | | |

The coating solutions were prepared by first dissolving the DD or Epon 1007 solid epoxy resin in the "Cellosolve" acetate-toluene solvent combination with stirring. Heat was also required in the case of the Epon 1007 resin. Then the liquid Durez phenolic resin was added and dissolved by stirring. Last was added the phosphoric acid solution in butanol with continuous stirring.

Solvent-cleaned cold rolled SAE 1010 commercial grade flat steel panels, No. 20 gauge, 0.035 inch thick, satin finish, were used as the substrate for coatings of the above 7 formulations.

Each of the above 7 coating solutions was coated on 2 small steel panels by means of a Bird film applicator with a 0.006" gap to lay down wet films 0.006" thick. Then the coated panels were immediately laid horizontally in an oven at 145° C. and were cured at this temperature for 90 minutes. They were then removed from the oven and were allowed to cool, coated side up, at room temperature.

The bending tests were carried out by bending the panels so as to elongate the coatings. The panels were bent manually over the edge of a laboratory bench top to the approximate angles shown above for the various To a 2-liter-3-neck round-bottom flask were added the polypropylene glycol-200, the ethylene dichloride solvent, the TDI, and half (1.0 ml.) of the stannous octoate catalyst. The flask had just been heated in an oven to remove traces of moisture and cooled to room temperature. The mixture was stirred for 4 hours. Then, the bis[p,p'-(3-chloro-2-hydroxy-1-oxypropyl)phenyl]isopropylidene was added as a 50% (by weight) solution in ethylene dichloride (200 gms. of solution) to the reaction mixture, and the other half (1.0 ml.) of the stannous octoate catalyst was then added. The solution was stirred for 1 hour.

After standing overnight, the reaction mixture and 60.0 gms. of 50% aqueous sodium hydroxide in 300 grams of ethylene dichloride solvent were put into a 2-liter flask previously heated to remove moisture. The contents of the flask were heated and stirred for 3½ hours, while the temperature was maintained at 75±1° C. The mixture was then neutralized with $CO_2$, dried over magnesium sulfate and filtered. Solvent was removed under vacuum until the measured solids content was 81.3%.

Analysis of product (based on 100% product—no solvent): Oxirane oxygen found—1.84%; active chlorine found hydrolyzable by $NaHCO_3$-chlorohydrin chlorins)—0.68%.

EXAMPLE 23

Diurethane tetraepoxide made from triols formed by adding propylene oxide to trimethylol propane (1) Diurethane tetraepoxide from triol of 400 molecular weight (Pluracol TP–440 from Wyandotte Chemicals Corporation).

Diurethane tetraepoxide resin was prepared from a 1.00/2.00/6.60 molar ratio of TDI/triol/epichlorohydrin (EPCH).

Analysis of the diurethane tetraepoxide:
  Oxirane oxygen found—3.54%
  Total chlorine found—3.62%
Viscosity of resin: 29,200 centipoises at 25° C.

| | Cure | Tens. | Elong. | Shore D |
|---|---|---|---|---|
| Diurethane tetraepoxide, 100 g | 1 wk. at RT[1] | 350 | 49 | 19 |
| AEP [2], 9.4 g | | 750 | 77 | 22 |
| Diurethane tetraepoxide resin, 66 g | | | | |
| Diglycidyl ether of bis-phenol A (Epon 828 epoxy resin), 33 g | 1 wk. at RT | 3,750 | 8 | 65 |
| AEP [2], 13.8 g | 1 wk. at 105° | 7,400 | 4 | 74 |
| | 3 wks. at 105° | 8,250 | 6 | 75 |

[1] Room temperature.
[2] Stoichiometric quantity of AEP (aminoethylpiperazine).

(2) Diurethane tetraepoxide made from triol of 700 molecular weight (Pluracol TP 740 from Wyandotte Chemicals Corporation).

Diurethane tetraepoxide resin was prepared from a 1.00/2.29/6.85 molar ratio of TDI/triol/EPCH.
Analysis of the diurethane tetraepoxide:
  Oxirane oxygen found—2.43%
  Total chlorine found—2.54%
  Active chlorine found (chlorine hydrolyzable by NaHCO₃)—0.84%
Viscosity at 25° C.: 4,650 centipoises

| | Cure | Tens. | Elong. | Shore D |
|---|---|---|---|---|
| Diurethane tetraepoxide, 100 g | 1 wk. at RT | 80 | 21 | 55 (Shore A) |
| AEP [1], 6.5 g | 1 wk. at 105° | 80 | 26 | 57 (Shore A) |
| Diurethane tetraepoxide, 50 g | 1 wk. at RT | 3,600 | 30 | 67 |
| Diglycidyl ether of bis-phenol A (Epon 828 epoxy resin), 50 g | 1 wk. at 105° | 4,200 | 28 | 71 |
| AEP [1], 14.5 g | | | | |

[1] Stoichiometric quantity of AEP.

Diurethane tetraepoxide was prepared from a 1.00/2.22/6.67 molar ratio of TDI/triol/EPCH.[6]
Analysis of the diurethane tetraepoxide:
  Oxirane oxygen found—2.84%
  Total chlorine found—2.71%
  Viscosity at 25° C.: 84 centipoises

| | Cure | Tens. | Elong. | Shore D |
|---|---|---|---|---|
| Diurethane tetraexpoxide, 66 g | 1 wk. at RT | 1,200 | 72 | 28 |
| Diglycidyl ether of bis-phenol A (Epon 828 epoxy resin), 33 g | 1 wk. at RT plus 1 wk. at 105° C. | 1,440 | 74 | 35 |
| AEP [1], 12.5 g | do | 1,800 | 85 | 36 |

[1] Stoichiometric quantity of AEP.

Procedure for synthesis of the diurethane tetraepoxide used in the last formulation above:

| Ingredients | | |
|---|---|---|
| Pluracol TP 740 triol, (molecular weight 750 [1]) | 1.00 mole | 750 g. |
| BF₃ etherate | | 1.5 ml. |
| EPC (molecular weight 92.5) | 3.00 moles | 277.5 g. |
| Stannous octoate catalyst (stabilized) | | 3.0 ml. |
| TDI (80% 2, 4; 20% 2, 6) (molecular weight 174) | 0.45 mole | 78.3 g. |
| NaOH flakes (molecular weight 40) | 4.5 moles (50% excess) | 180 g. |

[1] Triol 740, trimethylolpropanepropylene oxide condensates of approximately 700 molecular weight.

Procedure

The triol was weighed into 3-liter, 3-neck flask equipped with a glass stirrer, thermometer, addition funnel, and reflux condenser. Next, the BF₃ etherate was added. The mixture was heated to 70° C., and the epichlorohydrin was added dropwise while the temperature of the reaction mixture was maintained at 70° C. with an ice bath. The addition of the epichlorohydrin required 40 minutes. The reaction mixture was stirred at 70° C. for 1 hour after the addition of epichlorohydrin was completed. The reaction mixture was cooled to 10° C. and diluted with 500 ml. of ethylene dichloride solvent. The TDI was then added dropwise while the temperature of the reaction mixture was maintained at 10° C. during the addition

[6] Epichlorohydrin.

and for 2 hours of stirring after the addition was completed. The reaction mixture was allowed to stand at room temperature overnight.

The sodium hydroxide was added quickly while the temperature of the reaction mixture was maintained at 80° C. with stirring, and stirring was continued at 80° C. for a total of 2 hours after the start of the addition of the sodium hydroxide.

The reaction mixture was then neutralized with CO₂, dried over Na₂SO₄ for 30 minutes, and filtered.

The solvent was removed by heating with a steam bath under vacuum.
  Yield of product: 851 grams
  Theoretical yield: 995.5 grams
  Percent yield: 85.5
  Analysis of diurethane tetraepoxide product:
    Oxirane found—2.84%
    Total chlorine found—2.7%
    Viscosity at 25° C.: 8400 centipoises

EXAMPLE 24

Ethyl isocyanate (0.1 mole, 7.1 g.) was mixed with isopropylidene bis[1-(p-phenyleneoxy) - 3 - chloro-2-propanol] (41.5 g., 0.1 mole), 42 g. ethylene dichloride and 0.5 ml. stannous octoate. The mixture was allowed to stand overnight at room temperature to form the (beta-chloroalkylurethano) chlorohydrin. The mixture was then diluted with 150 ml. ethylene dichloride. At 70–75° C., over a period of 30 minutes, 16 g. (0.4 mole) of sodium hydroxide flakes was added portion-wise with stirring. Stirring was continued for an additional hour period. The reaction mixture was cooled, neutralized with carbon dioxide and filtered. Upon concentration to dryness in vacuo the epoxy oxazolidinone was obtained in the form of a viscous, yellow syrup. Upon polymerization with boron trifluoride etherate, a solid resin was recovered.

EXAMPLE 25

Isopropyl isocyanate (0.1 mole, 8.5 g.) was mixed with 115.0 g. (0.1 mole) of polyepichlorohydrin 1150 (a dichlorohydrin from the Dow Chemical Co.), 120 ml. of ethylene dichloride and 0.5 ml. stannous octoate. The mixture was allowed to stand overnight at room temperature to form the (beta-chloroalkylurethano) chlorohydrin. This was then diluted with 110 ml. of ethylene dichloride. At 70–75° C., 16 g. (0.4 mole) of sodium hydroxide flakes was added as in Example 8. By continuing the procedure of Example 24, a viscous syrupy product was obtained. The epoxy oxazolidinone product was polymerized with boron trifluoride etherate and a solid resin was recovered.

EXAMPLE 26

Dodecyl isocyanate (0.1 mole, 21.1 g.) was mixed with isopropylidene bis[1 - (p - phenyleneoxy) - 3 - chloro-2-propanol] (41.5 g., 0.1 mole), 75 g. ethylene dichloride and 0.5 ml. stannous octoate. The mixture was allowed to stand overnight at room temperature to form the (beta-chloroalkylurethano) chlorohydrin. The mixture was then diluted with 150 ml. ethylene dichloride. At 70–75° C., over a period of 30 minutes, 16 g. (0.4 mole) of sodium hydroxide flakes was added portion-wise with stirring. By continuing the procedure, as in Example 24, a viscous syrupy product was obtained. The epoxy oxazolidinone product was polymerized with boron trifluoride etherate and a solid resin was recovered.

EXAMPLE 27

α-Naphthyl isocyanate (0.1 mole, 16.9 g.) was mixed with 1,4-di(3-chloro-2-ol-propyloxy)butane (27.5 g., 0.1 mole), 40 ml. of ethylene dichloride and 0.5 ml. stannous octoate. The mixture was allowed to stand overnight at room temperature to form the (beta-chloroalkylurethano) chlorohydrin. It was then diluted with 110 ml. of ethylene dichloride. At 70–75° C., 16 g. (0.4 mole) of sodium hydroxide flakes was added as in Example 24. By continuing the procedure of Example 24 a viscous amber syrup was obtained. Again a solid resin was recovered after polymerization of the epoxy oxazolidinone product with boron trifluoride.

EXAMPLE 28

A monoisocyanate was prepared by treating 17.4 g. (0.1 mole) of tolylene diisocyanate (80% 2,4; 20% 2,6) with 13.0 g. (0.1 mole) of 1-octanol in 100 ml. ethylene dichloride in the presence of 0.2 ml. stannous octoate for 4 hours at room temperature, then at 3 hours at 40° C. Isopropylidene bis[1-(p-phenyleneoxy) - 3 - chloro-2-propanol] (41.5 g., 0.1 mole) and 0.4 ml. stannous octoate were added; the mixture was then allowed to stand overnight at room temperature to form the (beta-chloroalkylurethano) halohydrin. At 70–75° C., 16 g. (0.4 mole) of sodium hydroxide flakes was added as in Example 24. By following the procedure of Example 24 a viscous syrupy product was obtained. Again, a solid resin was recovered after polymerization of the epoxy oxazolidinone product with boron trifluoride.

In the preceding examples, tensile strength was measured in accordance with ASTM 638-52TD and recovered as pounds per square inch (p.s.i.), whereas the tests on electrical properties were measured in accordance with ASTM D-150-59T and ASTM D-150-54T.

As stated hereinbefore, the novel compounds of this invention include those prepared from a monoisocyanate (instead of a polyisocyanate) and a dihalohydrin. Also, other poly(halohydrins) can be employed in place of a di(halohydrin) in the reaction with a monoisocyanate. The poly(halohydrins) mentioned hereinbefore can be employed in preparing such compounds, but preferably the halohydrin groups of the polyhalohydrins are separated by at least one carbon atom. The monoisocyanate reactant can be of the types mentioned hereinbefore for polyisocyanates, e.g., a compound of the formula

wherein x is 1 and R is a monovalent aromatic or aliphatic group, e.g., alkyl, aryl, etc. These epoxyoxazolidinones can be represented by the formula:

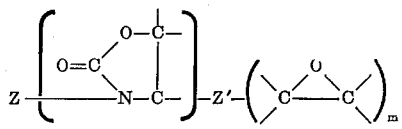

wherein Z is selected from aliphatic and aromatic structures consisting of alkyl, substituted alkyl, alkyloxy, alkenyl, substituted alkenyl, aryl and substituted aryl; Z' is selected from aliphatic and aromatic structures consisting of alkylene, substituted alkylene, alkyleneoxy, cycloalkylene, substituted cycloalkylene, arylene, substituted arylene, aralkylene and substituted aralkylene; and m is an integer from 1 to 5. Preferably, Z is hydrocarbyl having from about 6 to about 12 carbon atoms, e.g., alkyl, alkphenyl, and the like; m is 1 and Z' represents preferred Z' groups for the epoxyoxazolidinones as set forth in Formula B.

In preparing preferred compositions of this invention, the epoxyoxazolidinone compounds have the structure shown in Formula B, wherein Z' is attached to the 5 carbon atom of the oxazolidinone ring. However, isomeric compounds are coproduced wherein Z' is attached to the 4 carbon atom of the oxazolidinone ring as shown in Formula C. Such isomeric compounds are illustrated by the formula:

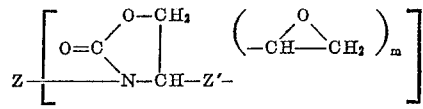

wherein Z, Z', m and n have the same meaning as in Formula B.

What is claimed is:
1. 3-allyl-5-epoxyethyl-2-oxazolidinone.
2. A compound of the formula:

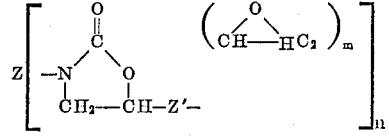

wherein Z is tolylene and Z' is the group

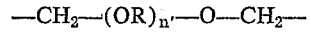

wherein R is alkylene of 2 to 4 carbon atoms and n' is an integer representing repeating units of the (OR) group, the said integer having a value equal to the number of repeating (OR) groups in poly (oxyalkylene) glycol having a molecular weight of from 150 to 1,000 and 2 to 4 carbon atoms in each alkylene group; m is 1 and n is 2.

3. A compound of claim 2 wherein Z' is the group —CH$_2$—(OR)$_n$—O—CH$_2$— wherein R is propylene, and n' is an integer representing repeating units of the (OR) group, the said integer having a value equal to the number of repeating (OR) groups in polypropylene glycol having a molecular weight of from about 150 to 1,000.

4. A compound of the formula:

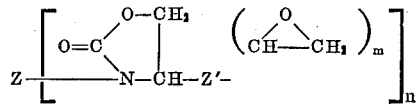

wherein Z is a divalent hydrocarbon having from about 6 to 12 carbon atoms seslected from the group consisting of alkylene, alkphenylene and phenylene; Z' is the group —CH$_2$—(OR)$_n$—O—CH$_2$— wherein R is alkylene of 2 to 4 carbon atoms and $n'$ is an integer representing repeating units of the (OR) group, the said integer having a value equal to the number of repeating (OR) groups in poly (oxyalkylene) glycol having a molecular weight of from 150 to 1,000 and 2 to 4 carbon atoms in each alkylene group, $m$ is 1 and $n$ is 2.

5. A compound of claim 4 wherein Z is tolylene and Z' is the group —$CH_2$—$(OR)_{n'}$—O—$CH_2$— wherein R is propylene and $n'$ is an integer representing repeating units of the (OR) group, said integer having a value equal to the number of repeating (OR) groups in polypropylene glycol having a molecular weight of from about 150 to 1,000.

References Cited

UNITED STATES PATENTS

| | | | |
|---|---|---|---|
| 2,786,043 | 3/1957 | Schuller et al. | 260—307.3 |
| 2,860,166 | 11/1958 | Newcomer et al. | 260—307.3 |
| 2,966,496 | 12/1960 | Arend et al. | 260—307.3 |
| 3,014,895 | 12/1961 | Reynolds et al. | 260—348.6 |
| 3,023,225 | 2/1962 | Reinking | 260—348.6 |
| 3,102,893 | 9/1963 | Gaertner | 260—348.6 |
| 3,118,913 | 1/1964 | Carlson | 260—348.6 |

OTHER REFERENCES

Najer, Giudicelli, et Menin: Bull. Soc. Chim., France, ser. 5 (1963), pp. 1810–3.

ALEX MAZEL, Primary Examiner

R. J. GALLAGHER, Assistant Examiner

U.S. Cl. X.R.

260—2, 30.2, 30.4, 88.3, 858